(12) United States Patent
Signer et al.

(10) Patent No.: US 7,715,182 B2
(45) Date of Patent: May 11, 2010

(54) DRIVE BOX

(75) Inventors: Ryan S. Signer, Derby, KS (US); John Dunham, Kechi, KS (US); Alan T. Pfeifer, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/167,472

(22) Filed: Jul. 3, 2008

(65) Prior Publication Data

US 2010/0002368 A1    Jan. 7, 2010

(51) Int. Cl.
*G06F 1/16* (2006.01)
(52) U.S. Cl. ............ 361/679.33; 710/107; 312/223.3; 454/184; 165/80.4
(58) Field of Classification Search ............ 361/679.02, 361/679.33, 679.4, 679.41; 710/4, 74, 107; 312/223.1, 223.2, 223.3, 223.4, 223.5; 454/184; 165/80.4
See application file for complete search history.

(56) References Cited

U.S. PATENT DOCUMENTS

| | | | |
|---|---|---|---|
| 6,741,463 B1* | 5/2004 | Akhtar et al. | 361/679.41 |
| 6,904,482 B2* | 6/2005 | Rietze et al. | 710/107 |
| 2006/0158833 A1* | 7/2006 | Belady et al. | 361/679 |
| 2007/0207720 A1* | 9/2007 | Henry et al. | 454/184 |

* cited by examiner

*Primary Examiner*—Hung V Duong
(74) *Attorney, Agent, or Firm*—Luedeka, Neely & Graham, P.C.

(57) ABSTRACT

A rack mount drive blade system having a chassis and a drive blade. The chassis has at least one blade bay to accept a drive blade, where the chassis accepts the drive blade into the blade bay with the drive blade in a horizontal orientation. Each blade bay has chassis to blade electrical contacts including at least one cable having a length, for making electrical connections between the chassis and the drive blade. Each blade bay also has slot portions for engaging the drive blade along a length of the drive blade. The chassis has at least one module bay to accept a shared resource module, where each module bay has chassis to module electrical contacts, for making electrical connections between the chassis and the shared resource module. The drive blade has a printed circuit board for providing electrical connections to and from components on the drive blade. The drive blade has at least one hard drive, and drive blade electrical contacts for making electrical connections to the chassis through the at least one cable. The drive blade has rail portions disposed along the length of the drive blade, the rail portions for engaging the slot portions of the bay. The drive blade can be at least partially removed from the chassis without breaking the electrical connections between the chassis and the drive blade.

15 Claims, 3 Drawing Sheets

DRIVE BOX

FIELD

This invention relates to the field of computer hardware. More particularly, this invention relates to designs for rack mounted hard drive boxes.

BACKGROUND

As with most things electronic, there is a desire to continually make computers smaller and smaller, or in other words, to put the same or a greater amount of computing power within a given amount of space. As a part of this process, rack mounting designs were developed.

Rack mount systems provide a frame—also known as the rack—that has a standard width, such as nineteen inches or twenty-three inches, and a depth of no more than about thirty-two inches. Screw holes are provided down the height of the rack on either side of the standard width, to receive different rack-mount components. These components are typically specified as being 1 U, 2 U, 3 U, 4 U, and so-forth in height, where the term 1 U is used to define one rack unit of height. 1 U typically equals about 1.75 inches of rack height. Therefore, a 2 U component is about 3.5 inches high, a 3 U component is about 5.25 inches high, and a 4 U component is about seven inches high.

One component that can fit a rack mount system is a blade system. Blade designs put some aspects of a computer on a card (referred to as a blade) that is inserted into an enclosure (referred to as a chassis). Typically, the chassis is designed to accommodate several blades, such as four, eight, nine, sixteen, etc. The chassis typically provides elements of the system that can be commonly used for all of the blades in the system, which elements might be unnecessarily redundant if these elements were individually provided by each of the blades.

For example, power supply, cooling, and network or bus communications are typically provided by the chassis. These services might be provided in a redundant manner, but are provided in a manner that reliability and uptime are enhanced without unnecessarily providing duplicated services. The blade portion of the design is removable from the chassis and can be replaced or augmented, typically without powering down or otherwise taking the other blades off-line.

Blade systems are typically constructed with the blades fitting into the chassis in a vertical alignment, where the blades make electrical contact to the services provided by the chassis using a backplane connector, where the electrical connections are made by pushing the blade firming into the backplane at the rear of the chassis, and then the electrical connections are broken by pulling the blade even slightly out of the backplane connector. Thus, while one blade can be removed without powering down an adjacent blade, all of the components on a single blade must be powered down in order to even so much as physically inspect any of the components on that blade.

The blade computing design can be applied to different aspects of a computing system. For example, computers themselves can be configured into a blade design, where each blade in the system provides computing power with memory and a central processing unit. The blade concept can also be applied to data storage, with devices called storage blades or, alternately, drive blades.

Storage blades typically hold some number of individual hard drives, such as two, four, seven, eight, etc. However, it is always desirable for a storage blade system to hold as many drives as possible. The problem is that the number of drives is limited not only be the size of the rack in which the chassis is mounted, but also by the multiple of the unit depth, as described above, which might not align well with the actual height of the drives. Further, the material from which the blades are constructed can only take so much weight. Thus, there are constraints on the number of hard drives that can fit into a drive blade system. Further, the limitations of the blade concept tend to require that all of the components on a given blade must be shut down when even just one component needs to be replaced.

What is needed, therefore, is a system that overcomes problems such as those described above, at least in part.

SUMMARY

The above and other needs are met by a rack mount drive blade system having a chassis and a drive blade. The chassis has at least one blade bay to accept a drive blade, where the chassis accepts the drive blade into the blade bay with the drive blade in a horizontal orientation. Each blade bay has chassis to blade electrical contacts including at least one cable having a length, for making electrical connections between the chassis and the drive blade. Each blade bay also has slot portions for engaging the drive blade along a length of the drive blade. The chassis has at least one module bay to accept a shared resource module, where each module bay has chassis to module electrical contacts, for making electrical connections between the chassis and the shared resource module. The drive blade has a printed circuit board for providing electrical connections to and from components on the drive blade. The drive blade has at least one hard drive, and drive blade electrical contacts for making electrical connections to the chassis through the at least one cable. The drive blade has rail portions disposed along the length of the drive blade, the rail portions for engaging the slot portions of the bay. The drive blade can be at least partially removed from the chassis without breaking the electrical connections between the chassis and the drive blade.

Thus, many of the problems as described above are overcome by the rack mount drive blade system according to the present invention. For example, because electrical connections between the drive blade and chassis are made using a cable instead of a plane connector, the drive blade can be removed to some extent to accommodate inspection of the drives on the drive blade, without interrupting the operation of the drives on the drive blade. Further, the horizontal configuration of the drive blades allows a greater number of drives to be placed within the rack mount system.

In various embodiments, the chassis has a width of about nineteen inches, a length of about thirty-two inches, and a height of about seven inches. In some embodiments the drive blade can be completely removed from the chassis without breaking the electrical connections between the chassis and the drive blade. In some embodiments the chassis has five blade bays. The chassis has four module bays in some embodiments. The shared resource module in some embodiments is at least one of a hard drive controller and a power supply. In some embodiments the chassis includes fans for cooling the drive blade. The drive blade of some embodiments has twelve hard drives. The system contains a total of sixty hard drives in some embodiments. In some embodiments the chassis to module electrical contacts comprise a mid-plane connector. In some embodiments the drive blade is inserted into and removed from the blade bay through a front of the chassis. The shared resource module of some embodiments is inserted into and removed from the module bay through a back of the chassis. The length of the cable is such that the drive blade can be at least partially ejected from the chassis and the at least one hard drive inspected, removed, and replaced without breaking the electrical connections between the chassis and the drive blade, in some embodiments.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
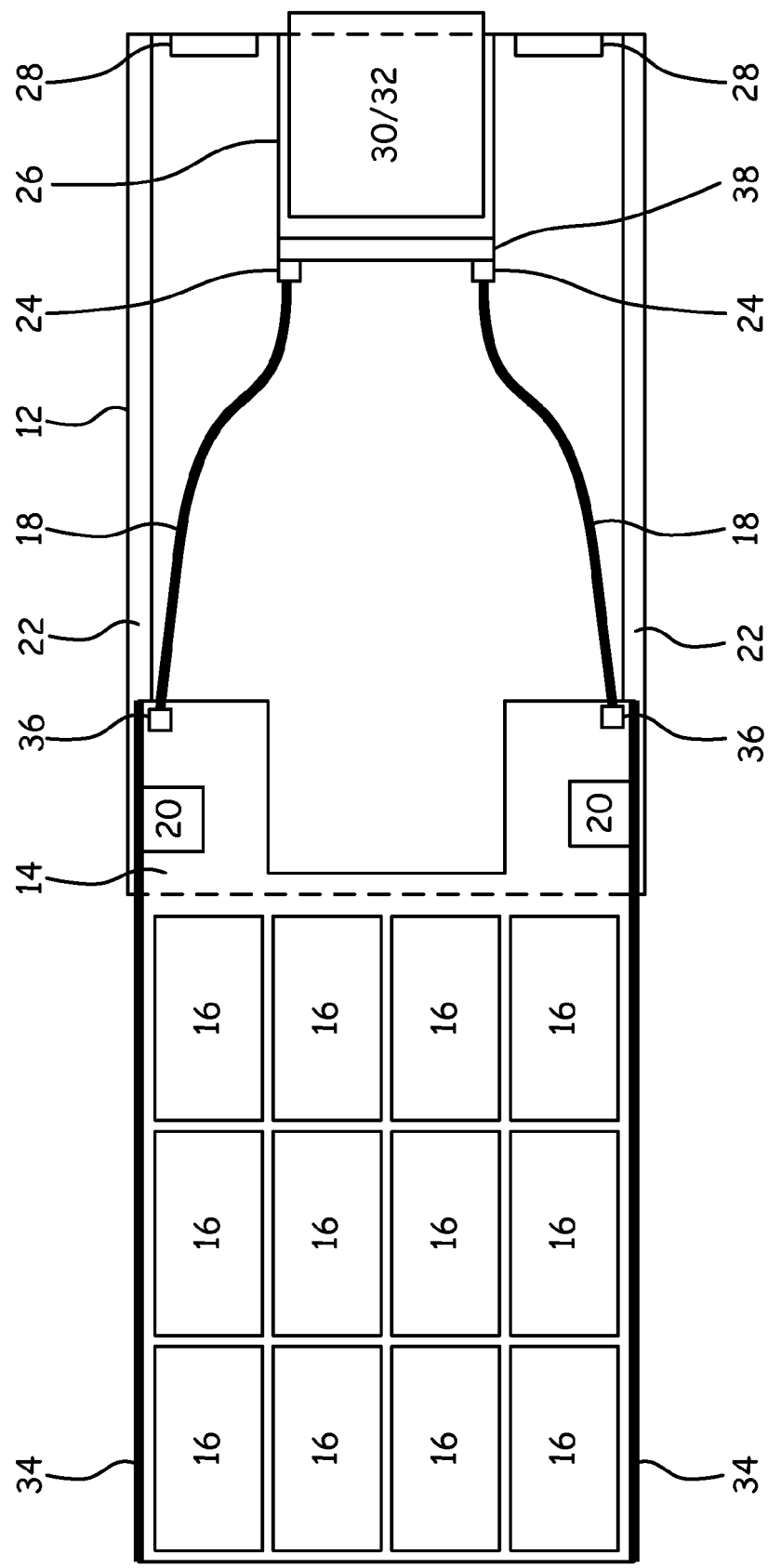
FIG. 1 is a top plan/cross sectional view of a horizontal drive blade partially inserted into a rack mount chassis according to an embodiment of the present invention.

With reference now to FIG. 1, there is depicted a combination top plan/cross sectional view of a rack mount drive blade system 10, with a horizontal drive blade 14 partially inserted into a rack mount chassis 12 according to an embodiment of the present invention. By "horizontal" it is meant that the drive blade 14 is oriented in a plane that is substantially horizontal, rather than in the standard vertical orientation of prior art drive blades.

The drive blade 14 includes a number of hard drives 16. In the present embodiment, the drive blade 14 has four rows of three drives 16 each, for a total of twelve drives 16. Other configurations and numbers of hard drives 16 are also possible. However, in the present arrangement, the drive blade 14 can be configured to hold twelve 3.5 inch drives 16 within a standard nineteen inch wide rack, at a depth of no more than thirty-two inches. With this configuration, the drive blade 14 forms a part of a system 10 that can hold a large amount of hard drives 16, as described with more detail hereafter.

The drive blade 14 contains circuitry for electrically connecting the drives 16 to one or more interface connectors 36, which provide both signal connections and power connects, and in some embodiments control connections, to the drives 16. The drives 16 can be configured in RAIDs or otherwise, as desired. Additional electronics can also be provided on the drive blade 14, such as controller, interface, diagnostics, reporting, and other circuits.

The drive blade 14 in one embodiment is provided with rail portions 34 down each of the two long edges of the drive blade 14, which rail portions 34 fit into mating slot portions 22 of the chassis 12. The rail portions 34 slide along within the slot portions 22, providing a pathway for the drive blade 14 to be inserted into and extracted from the chassis 12. In some embodiments, combined motor and traction means 20 engage either the slot portions 22 or other mating elements on the chassis 12, and move the drive blade 14 into or out of the chassis 12.

Bay portion 26 of the chassis 12 provides bays for electrical components that are only attached to the drive blade 14 via one or more cables 18 that are connected to the drive blade 14 via interface connectors 36 and to the electrical components in the bay portion 26 via interface connectors 24. Also physically mounted to the chassis 12 and electrically connected to the electronics in the bay portion 26 (in some embodiments) are fans 28.

Figure 3:
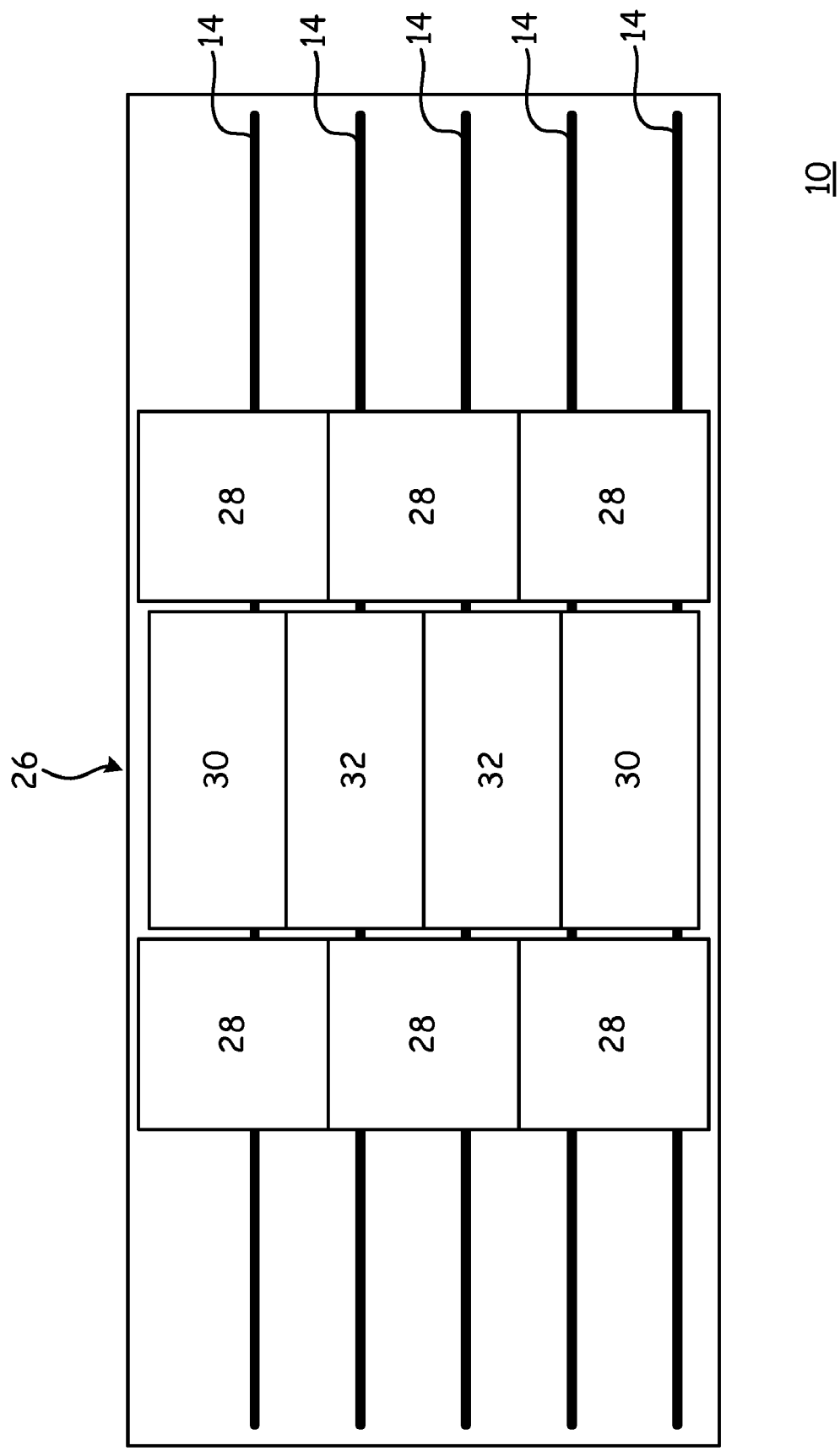
FIG. 3 is a back view of a rack mount chassis according to an embodiment of the present invention.

With reference now to FIG. 3, there are depicted four modules within the bay portion 26 of the chassis 12, including two power supply modules 30 and two other modules 23, which might provide a variety of different functions, such as controllers for the drives 16. In one embodiment the bay portion 26 is a storage bridge bay, and the modules are storage bridge bay canisters. In one embodiment, the modules are inserted and removed from the back of the chassis 12, whereas the drive blade 14 is inserted and removed from the front of the chassis 12. With reference again to FIG. 1, the modules in the bay portion 26 of the chassis 12 make electrical connections with the other components of the system 10, in some embodiments, through a mid-plane connector 38 mid-plane connector 38 can be electrically connected to the interface connections 24, thus completing electrical connections from the modules 23 to the drive blades 14.

As indicated in FIG. 3, the chassis 12 is preferably sized to hold five of the storage blades 14. This capacity is provided, in one embodiment, within a chassis 12 that is 4 U in height, or in other words, is about seven inches in height. In this manner, the system 10 provides sixty hard drives in a standard rack mount 4 U space. This is a greater capacity/density of hard drives than prior art storage blade systems.

Figure 2:
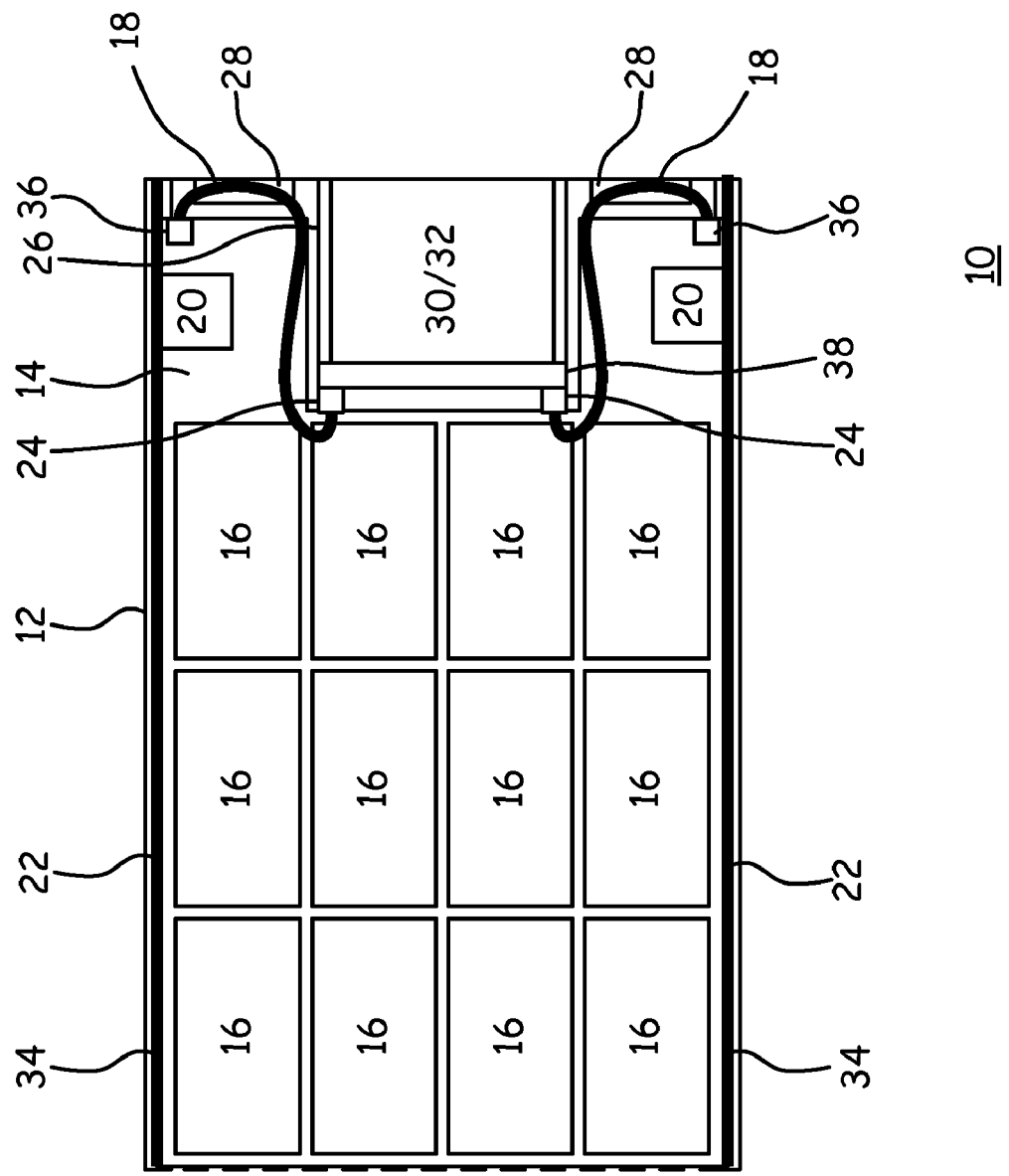
FIG. 2 is a top plan/cross sectional view of a horizontal drive blade completely inserted into a rack mount chassis according to an embodiment of the present invention.

With reference now to FIG. 2, the system 10 is depicted with the drive blade 14 partially removed from the chassis 12. Because the drive blade 14 makes electrical connections to the chassis 12 through the cables 18, rather than through a back-plane or mid-plane connector, the drive blade 14 can be removed to some degree from the chassis 12 without electrically disconnecting the drive blade 14. In some embodiments, the cables 18 are long enough that the drive blade 14 can be completely removed from the chassis 12 without electrically disconnecting the drive blade 14 from the chassis 12.

Thus, in these embodiments of the present invention, various components on the drive blade 14 can be inspected, and even individually disconnected and replaced, without taking the entire drive blade 14 off-line. For example, if one of the drives 16 on the drive blade 14 has gone down, the drive blade 14 can be partially or completely removed from the chassis 12, and the bade drive 16 can be located, removed, and replaced with a good drive 16 without taking any of the other drives 16 or other electrical components of the drive blade 14 off-line. In embodiments where the motors 20 are provided, electronics can be provided the control how far out the drive blade 14 is extended to inspect the drives 16, and can also control other aspects of the motion, such as how many drive blades 14 can be extended at a given time. A single chassis 12 front cover can be put in place when all of the drive blades 14 are retracted into the chassis 12, to provide shielding for electromagnetic interference.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A rack mount drive blade system, comprising:
a chassis having,
at least one blade bay to accept a drive blade, where the chassis accepts the drive blade substantially into the blade bay through a front of the chassis with the drive blade in a horizontal orientation,
each blade bay having chassis to blade electrical contacts including at least one cable having a length, for making electrical connections between the chassis and the drive blade,
each blade bay having slot portions for engaging the drive blade along a length of the drive blade, and
at least one module bay to accept a shared resource module through a back of the chassis and substantially within the chassis, each module bay having chassis to module electrical contacts, for making electrical connections between the chassis and the shared resource module, wherein the chassis to module electrical contacts comprise a mid-plane connector, and
the drive blade having,
a printed circuit board for providing electrical connections to and from components on the drive blade,
at least one hard drive,
drive blade electrical contacts for making electrical connections to the chassis through the at least one cable, and
rail portions disposed along the length of the drive blade, the rail portions for engaging the slot portions of the bay,
wherein the drive blade can be at least partially removed from the chassis without breaking the electrical connections between the chassis and the drive blade.

2. The rack mount drive blade system of claim 1, wherein the chassis has a width of about nineteen inches, a length of about thirty-two inches, and a height of about seven inches.

3. The rack mount drive blade system of claim 1, wherein the drive blade can be completely removed from the chassis without breaking the electrical connections between the chassis and the drive blade.

4. The rack mount drive blade system of claim 1, wherein the chassis has five blade bays.

5. The rack mount drive blade system of claim 1, wherein the chassis has four module bays.

6. The rack mount drive blade system of claim 1, wherein the shared resource module is at least one of a hard drive controller and a power supply.

7. The rack mount drive blade system of claim 1, wherein the chassis further comprises fans for cooling the drive blade.

8. The rack mount drive blade system of claim 1, wherein the drive blade has twelve hard drives.

9. The rack mount drive blade system of claim 1, wherein the system contains a total of sixty hard drives.

10. The rack mount drive blade system of claim 1, wherein the length of the cable is such that the drive blade can be at least partially ejected from the chassis and the at least one hard drive inspected, removed, and replaced without breaking the electrical connections between the chassis and the drive blade.

11. A rack mount drive blade system, comprising:
a chassis having,
five blade bays, each adapted to accept a drive blade, where the chassis accepts the drive blade substantially into the blade bay through a front of the chassis with the drive blade in a horizontal orientation,
each blade bay having chassis to blade electrical contacts including at least one cable having a length, for making electrical connections between the chassis and the drive blade,
each blade bay having slot portions for engaging the drive blade along a length of the drive blade,
four module bays, each adapted to accept a shared resource module through a back of the chassis and substantially within the chassis, each module bay having chassis to module electrical contacts, for making electrical connections between the chassis and the shared resource module, wherein the chassis to module electrical contacts comprise a mid-plane connector, and
fans for cooling the drive blades, and
the drive blade having,
a printed circuit board for providing electrical connections to and from components on the drive blade,
twelve hard drives disposed horizontally on the printed circuit board,
drive blade electrical contacts for making electrical connections to the chassis through the at least one cable, and
rail portions disposed along the length of the drive blade, the rail portions for engaging the slot portions of the bay,
wherein the drive blade can be at least partially removed from the chassis without breaking the electrical connections between the chassis and the drive blade.

12. The rack mount drive blade system of claim 11, wherein the chassis has a width of about nineteen inches, a length of about thirty-two inches, and a height of about seven inches.

13. The rack mount drive blade system of claim 11, wherein the drive blade can be completely removed from the chassis without breaking the electrical connections between the chassis and the drive blade.

14. The rack mount drive blade system of claim 11, wherein the shared resource module is at least one of a hard drive controller and a power supply.

15. The rack mount drive blade system of claim 11, wherein the length of the cable is such that the drive blades can be at least partially ejected from the chassis and any of the twelve hard drives on a given one of the drive blades can be inspected, removed, and replaced without breaking the electrical connections between the chassis and the given drive blade.

* * * * *